United States Patent
Mameda et al.

(10) Patent No.: US 8,668,395 B2
(45) Date of Patent: Mar. 11, 2014

(54) MATERIAL IMAGING APPARATUS

(75) Inventors: Hiroshi Mameda, Aichi (JP); Hiroyuki Furusawa, Aichi (JP); Shinsuke Ikeno, Aichi (JP)

(73) Assignee: Elmo Co., Ltd., Aichi (JP)

( * ) Notice: Subject to any disclaimer, the term of this patent is extended or adjusted under 35 U.S.C. 154(b) by 18 days.

(21) Appl. No.: 13/432,400

(22) Filed: Mar. 28, 2012

(65) Prior Publication Data
US 2012/0251091 A1 Oct. 4, 2012

(30) Foreign Application Priority Data
Apr. 4, 2011 (JP) ................. 2011-082419

(51) Int. Cl.
*G03B 17/02* (2006.01)
*H04N 5/225* (2006.01)

(52) U.S. Cl.
USPC ............................ 396/428; 396/535; 348/373

(58) Field of Classification Search
USPC .......... 396/428–431, 300, 419, 535; 348/373, 348/552
See application file for complete search history.

(56) References Cited

U.S. PATENT DOCUMENTS
2008/0187309 A1* 8/2008 Sukenari et al. .............. 396/428

FOREIGN PATENT DOCUMENTS
JP B2-4597874 10/2010

* cited by examiner

*Primary Examiner* — Rochelle-Ann J Blackman
(74) *Attorney, Agent, or Firm* — Posz Law Group, PLC

(57) ABSTRACT

A material imaging apparatus includes a base, support pillar and imaging camera divided into a camera base and a camera neck. The camera is mounted via a first shaft on the pillar so as to be pivotable between a right horizontal position where an imaging lens is located on a base right side and a left horizontal position where the lens is located on base left side. The camera neck is mounted via a second shaft on the camera base so as to be rotatable between a downwardly vertical position where when the camera assumes the right or left horizontal position, the lens is directed to the base placement surface side and lens optical axis is substantially vertical to the base placement surface, and an upwardly vertical position where the lens is directed to a side opposite the base placement surface and the optical axis assumes a substantially vertical position.

3 Claims, 16 Drawing Sheets

MATERIAL IMAGING APPARATUS

CROSS-REFERENCE TO RELATED APPLICATIONS

This application is based upon and claims the benefit of priority from the prior Japanese Patent Application No. 2011-082419 filed on Apr. 4, 2011, the entire contents of which are incorporated herein by reference.

BACKGROUND

1. Technical Field

The present disclosure relates to a material imaging apparatus which images materials and display obtained images of the materials on a monitor or a screen.

2. Related Art

Japanese Patent No. 4597874 discloses one type of material imaging apparatus comprising a base with a substantially rectangular planar shape, a support pillar standing on a part of the base near a middle front in a right-left direction and having a distal end which is curved so as to project in such a direction that the distal end departs from the base, and an imaging camera pivotally mounted via a first connecting shaft on the distal end of the support pillar within a plane vertical to a base placement surface on which the base is placed.

The imaging camera includes an imaging lens protruding from a side of a lengthwise end of a casing and an operating portion provided on the other lengthwise end of the casing. The imaging camera is further divided into a camera base on which the first connecting shaft is mounted and a camera neck in which the imaging lens is mounted. The location of the first connecting shaft is shifted from the lengthwise central part with respect to the casing so that the distance from the first connecting shaft to the imaging lens is longer than the distance from the first connecting shaft to the operating portion. The camera neck is rotatably mounted on the camera base via a second connecting shaft extending in a lengthwise direction with respect to the casing.

In the above-described material imaging apparatus, the imaging camera is mounted via the first connecting shaft on the support pillar so that the imaging lens thereof is located at either right or left side of the base and so that the imaging camera is pivotable between a horizontal position where the imaging camera is substantially parallel to the base placement surface and a vertical position where the imaging camera droops from a distal end of the support pillar. Furthermore, the camera neck is mounted via the second connecting shaft on the camera base so as to be pivotable between a downwardly vertical position where the imaging lens is directed to the base placement surface when the imaging camera assumes the horizontal position and an optical axis of the imaging lens is perpendicular to the base placement surface, and a horizontal position where the optical axis of the imaging lens is substantially parallel to the base placement surface.

When a material is imaged by the material imaging apparatus, the imaging camera is set to the horizontal position and the imaging lens is set to the downwardly vertical position. The material is placed on either right or left side of the base on the base placement surface thereby to be imaged. Furthermore, a region in front of the base can be imaged when both imaging camera and imaging lens are set to the respective horizontal positions. The imaging camera is set to the vertical position when the material imaging apparatus is not used.

When a material placed on the base placement surface is imaged by the above-described conventional material imaging apparatus, the region at either right or left side of the base on the base placement surface serves as a space in which the material is placed. In this case, the material cannot be placed in the region at the other side of the base to be imaged. The space available as a material placement space is limited.

SUMMARY

Therefore, an object of the disclosure is to provide a material imaging apparatus which can use both of the right and left sides of the base on the base placement surface as the material placement space.

The present disclosure provides a material imaging apparatus comprising a base having a substantially rectangular planar shape; a support pillar standing on a middle part of the base in a right-left direction with respect to the base, the support pillar having a distal end which is curved so as to project in a direction such that the distal end thereof departs forward from the base; and an imaging camera mounted via a first connecting shaft on the distal end of the support pillar so as to be pivotable within a plane substantially perpendicular to a base placement surface, the imaging camera including a casing, an imaging lens projecting from a side of the casing located at one of two lengthwise ends of the casing and an operating portion provided on the other lengthwise end surface of the casing, the imaging camera being divided into a camera base provided with a first connecting shaft and a camera neck provided with the imaging lens. In the apparatus, the first connecting shaft is shifted from the lengthwise middle of the casing so that a distance from the first connecting shaft to the imaging lens is longer than a distance from the first connecting shaft to the operating portion; the camera neck is rotatably mounted via a second connecting shaft on the camera base, the second connecting shaft having a shaft center extending in the lengthwise direction of the casing; the imaging camera is mounted via the first connecting shaft on the support pillar so as to be pivotable within a plane substantially perpendicular to the base placement surface between a right horizontal position where the imaging lens is located on a right side of the base and the casing is substantially in parallel to the base placement surface and a left horizontal position where the imaging lens is located on a left side of the base and the casing is substantially in parallel to the base; and the camera neck is mounted via the second connecting shaft on the camera base so as to be rotatable between a downwardly vertical position where when the imaging camera assumes the right or left horizontal position, the imaging lens is directed to the base placement surface side and an optical axis of the imaging lens is substantially vertical to the base placement surface, and an upwardly vertical position where the imaging lens is directed to a side opposed to the base placement surface and the optical axis of the imaging lens is substantially vertical position.

According to the above-described construction, when the imaging camera is set to the right horizontal position and the imaging lens is set to the downwardly vertical position, the base placement surface area located on the right side of the base can be used as a material placement space. Furthermore, when the imaging camera is set to the left horizontal position and the imaging lens is set to the downwardly vertical position, the base placement surface area located on the left side of the base can be used as a material placement space.

Furthermore, when the imaging lens is set to an intermediate horizontal position between the downwardly vertical position and the upwardly vertical position, front and rear views with respect to the imaging camera can also be imaged. Thus, the right and left installation surface areas at the front side of the base can be used as the material placement spaces.

In addition to this advantageous effect, the front and rear views with respect to the imaging camera can also be imaged.

In one embodiment, the support pillar is mounted via a third connecting shaft on the base so as to be tiltable relative to the base. According to this, the height of the apparatus can be reduced when the support pillar is tilted to the front side of the base. This can reduce a space necessary to store the apparatus, with the result that the storability of the apparatus can be improved.

In another embodiment, the support pillar is rotatably mounted via a fourth connecting shaft on the base so that the imaging camera is pivotable about 180 degrees from the right or left horizontal position within the plane substantially parallel to the base placement surface to rearward of the base. According to this, the right or left rear base placement surface area with respect to the base can be used as the material placement space.

DETAILED DESCRIPTION

Figure 1:
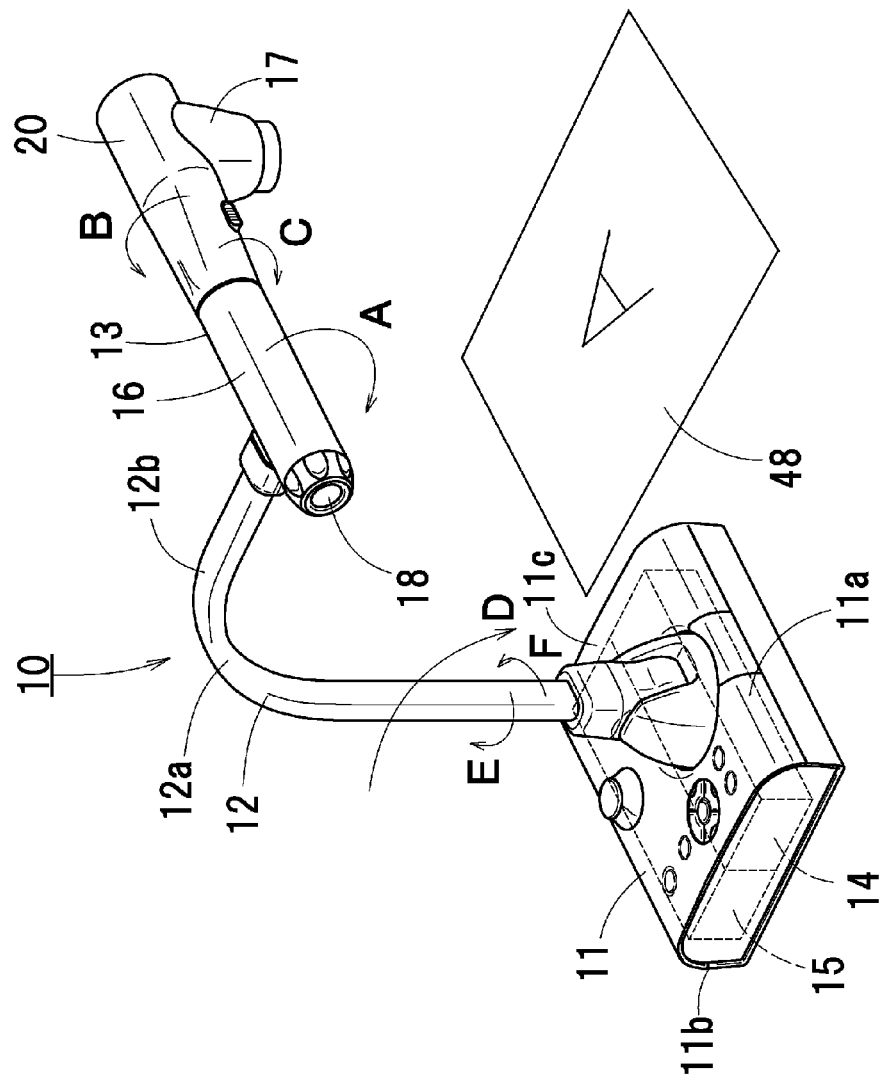
FIG. 1 is a perspective view of a material imaging apparatus according to one embodiment, showing a basic form of the apparatus.

One embodiment will be described with reference to the accompanying drawings. Referring to FIG. 1, a material imaging apparatus according to the embodiment is shown. The material imaging apparatus 10 includes a base 11, a support pillar 12 and an imaging camera 13. The base 11 is formed into a generally rectangular planar shape and has a front and a rear both of which are formed with curved surfaces 11a and 11b respectively. The base 11 houses a control circuit unit 14 and weights 15. The weights 15 prevents a rear 11b side of the base 11 from floating upward when the support pillar 12 is tilted frontward. The rear 11b of the base 11 is provided with various connecting sockets or outlets for electrical connection of external apparatuses or devices.

The support pillar 12 stands on a predetermined part of an upper surface 11c of the base 11. The part is located in the middle of the base 11 in a right-left direction and near the front 11a of the base 11. The support pillar 12 has a hollow interior through which wire harness (not shown) and the like can be inserted. The support pillar 12 is formed with a curved portion 12a having a distal end on which is formed a horizontal portion 12b which protrudes frontward so as to depart from the front 11a of the base 11. The imaging camera 13 is mounted on a distal end of the horizontal portion 12b.

The imaging camera 13 has a substantially cylindrical casing 16 having a right end side surface from which an imaging lens 17 projects downward. An operating portion 18 is provided on a left end surface of the casing 16. The operating portion 18 includes an autofocus button and a zooming dial. The imaging camera 13 is divided into a camera base 19 and a camera neck 20 in a lengthwise direction of the casing 16.

Figure 2:
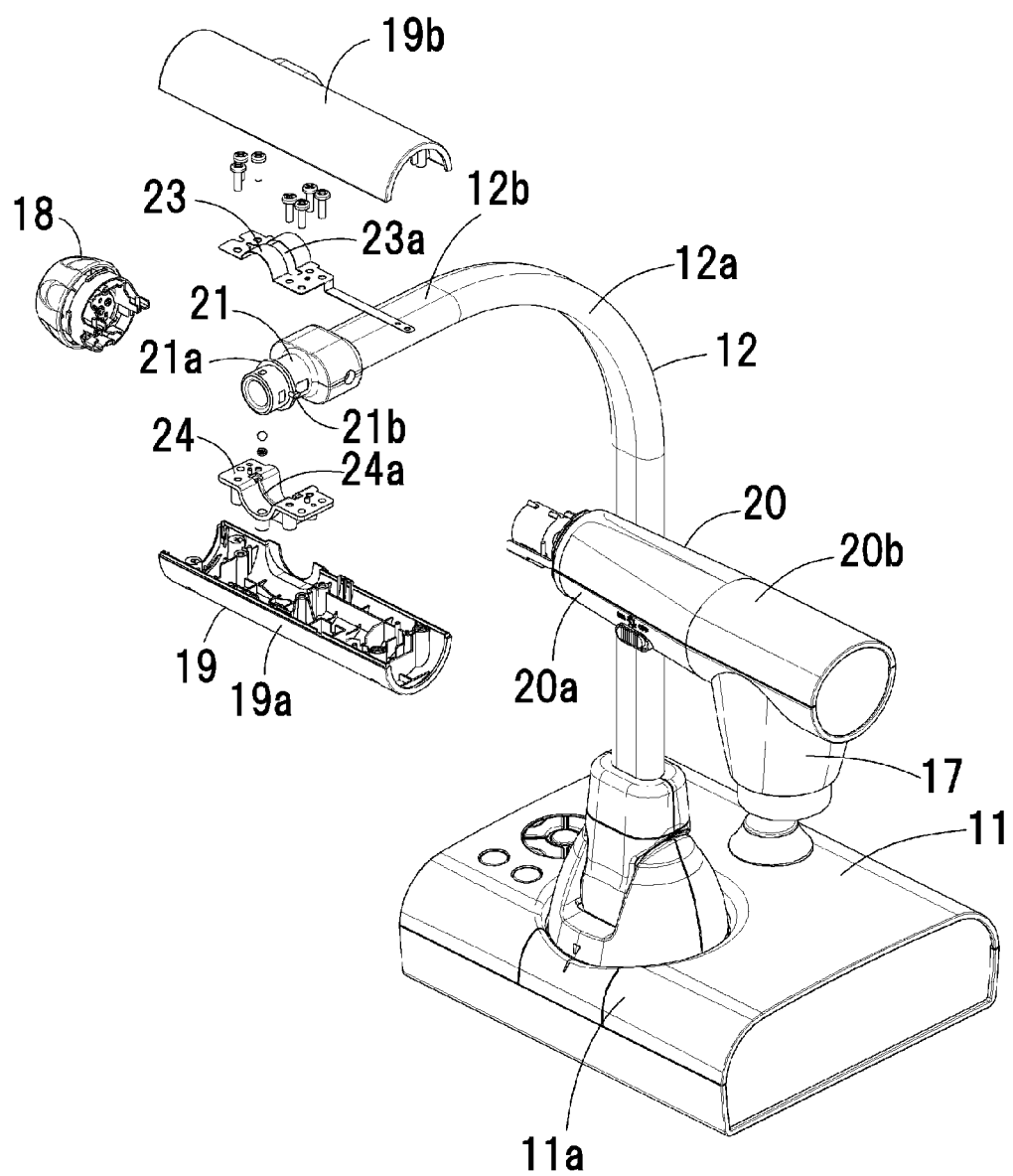
FIG. 2 is an exploded perspective view of a first connecting shaft, its periphery and a camera base.

The camera base 19 is mounted via a first connecting shaft 21 on a distal end of the support pillar 12 as shown in FIG. 2. On the other hand, the camera neck 20 incorporates a camera body including the imaging lens 17 and an imaging device. The camera neck 20 is mounted via a second connecting shaft 22 (see FIG. 3) on the camera base 19. The camera base 19 and the camera neck 20 are provided with lower covers 19a and 20a and upper covers 19b and 20b respectively.

The first connecting shaft 21 has a hollow structure and is fixed to a distal end of the horizontal portion 12b of the support pillar 12. The first connecting shaft 21 has an outer periphery with a guide flange 21a formed integrally therewith. The outer periphery of the first connecting shaft 21 further has a stopper pin 21b projecting therefrom in proximity to the guide flange 21a. The first connecting shaft 21 is held between an upper bracket 23 and a lower bracket 24, both of which are fixed to the lower cover 19a of the camera base 19 by small screws. The lower bracket 24 is formed with a semicircular guide groove 24a in which the guide flange 21a of the first connecting shaft 21 is fitted. The upper bracket 23 is also formed with a semicircular groove 23a into which the stopper pin 21b is inserted. The camera base 19 is mounted on the first connecting shaft 21 so as to be pivotable within a plane perpendicular to the base placement surface between a location where the stopper pin 21b abuts on a right end of the groove 23a and a location where the stopper pin 21b abuts on a left end of the groove 23a. The camera base 19 has a range of pivot angle that is set to 180 degrees in a clockwise as viewed at the front of the base 11, as shown by arrow A in FIG. 1. When the stopper pin 21b abuts on the right end of the groove 23a, the imaging camera 13 assumes a right horizontal position, as will be described in detail later. When the imaging camera 13 assumes the right horizontal position, the imaging lens 17 is located on the right of the base 11 and the casing 16 is substantially in parallel to the base placement surface, as shown in FIG. 1. Furthermore, the imaging camera 13 assumes a left horizontal position when the stopper pin 21b abuts on the left end of the groove 23a. When the imaging camera 13 assumes the left horizontal position, the imaging lens 17 is located on the left of the base 11 and the casing 16 is substantially in parallel to the base placement surface.

Figure 3:
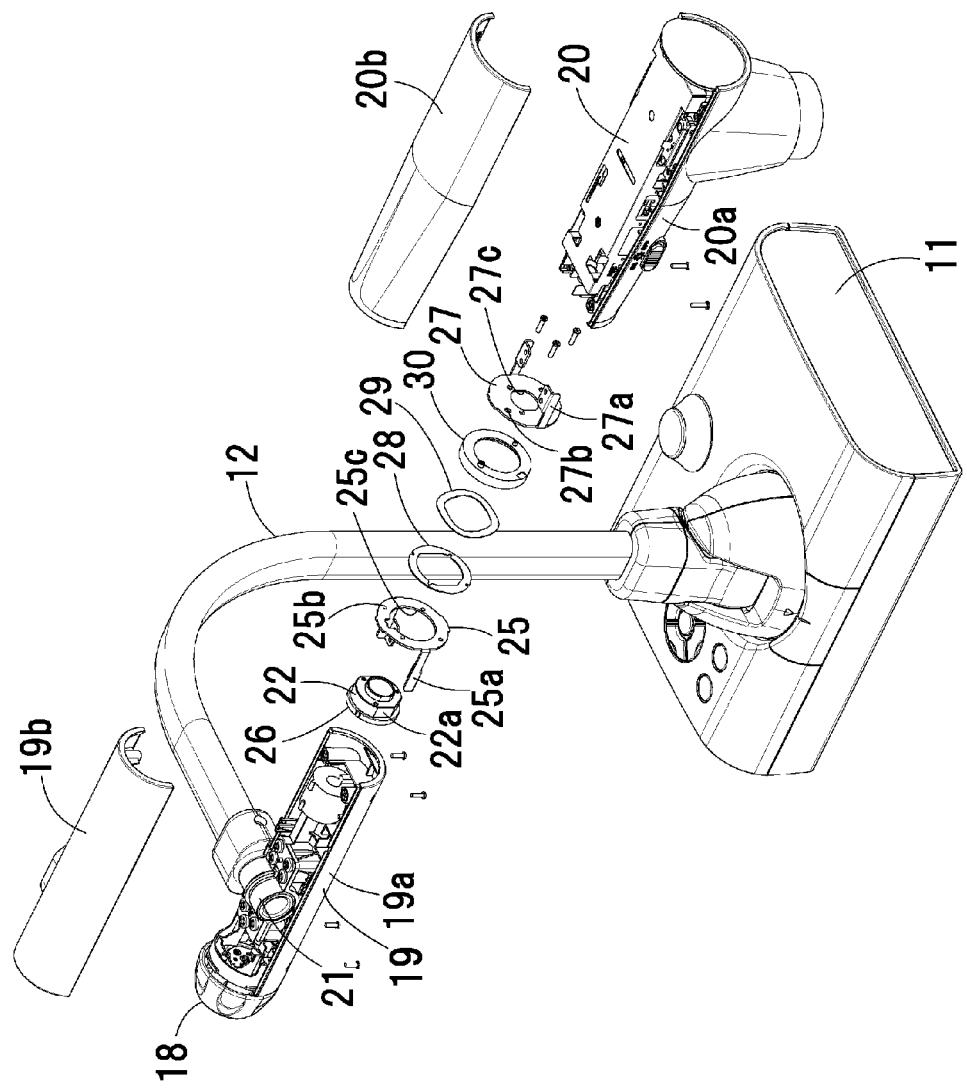
FIG. 3 is an exploded perspective view of a second connecting shaft, its periphery, the camera base and a camera neck.

The camera base 19 and the camera neck 20 of the imaging camera 13 are connected together by a second connecting shaft 22 having a shaft center extending in the lengthwise direction of the casing 16, as shown in FIG. 3. The second connecting shaft 22 is rotatably mounted via a ring-shaped first bracket 25 on the lower cover 19a of the camera base 19. The first bracket 25 has a leg strip 25a which is fixed to the lower bracket 19a by a small screw. The second connecting shaft 22 has a flange 26 formed on one of two ends thereof and a notch 22a formed in an outer periphery thereof so that the outer periphery has a non-circular cross-section. When the second connecting shaft 22 is inserted into a hole 25c of the first bracket 25, the flange 26 abuts on the first bracket 25, whereby the second connecting shaft 26 is retained in the inserted state.

The first bracket 25 is formed with a plurality of protrusions 25b. A second bracket 27 is fixed to the lower case 20a of the camera neck 20. The second bracket 27 has a leg strip 27a which is fixed to the lower case 20a by a small screw. The second bracket 27 is formed with a plurality of small holes 27b corresponding to the protrusions 25b of the first bracket 25 respectively. The second bracket 27 is also formed with a centrally located non-circular hole 27c. A flat washer 28, a wave washer 29 and a spacer 30 are sequentially attached to the second connecting shaft 22 rotatably mounted via the first bracket 25 on the lower cover 19a of the camera base 19. The second bracket 27 is fixed to the second connecting shaft 22 by a small screw so that the flat washer 28 the wave washer 29 and the spacer 30 are held. The second connecting shaft 22 is then fitted in the non-circular hole 27c of the second bracket 27. Consequently, the camera neck 20 is rotatably mounted via the second connecting shaft 22 on the camera base 19.

Figure 4:
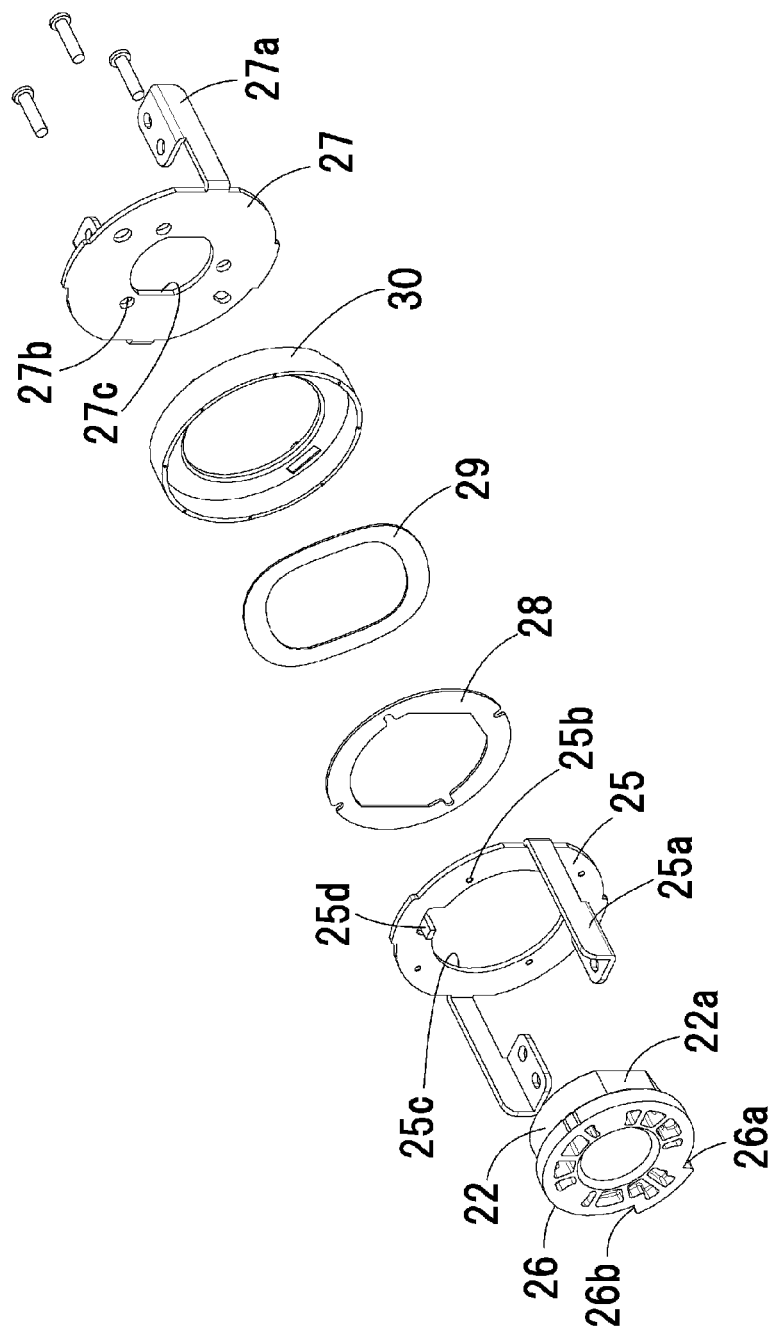
FIG. 4 is an exploded perspective view of the second connecting shaft.

The flange 26 of the second connecting shaft 22 has two stopper surfaces 26a and 26b, whereas the first bracket 25 has a stopper pin 25d, as shown in FIG. 4. Upon rotation of the camera neck 20, the second connecting shaft 22 is also rotated to cause the stopper pin 25d to abut on the stopper surface 26a or 26b, whereby the rotation of the camera neck 20 is limited. The neck 20 has a range of rotational angle that is set to 185 degrees in a clockwise direction and 120 degrees in a counter-clockwise direction as viewed at the right side of the base 11, as shown by respective arrows B and C in FIG. 1.

Figure 5:
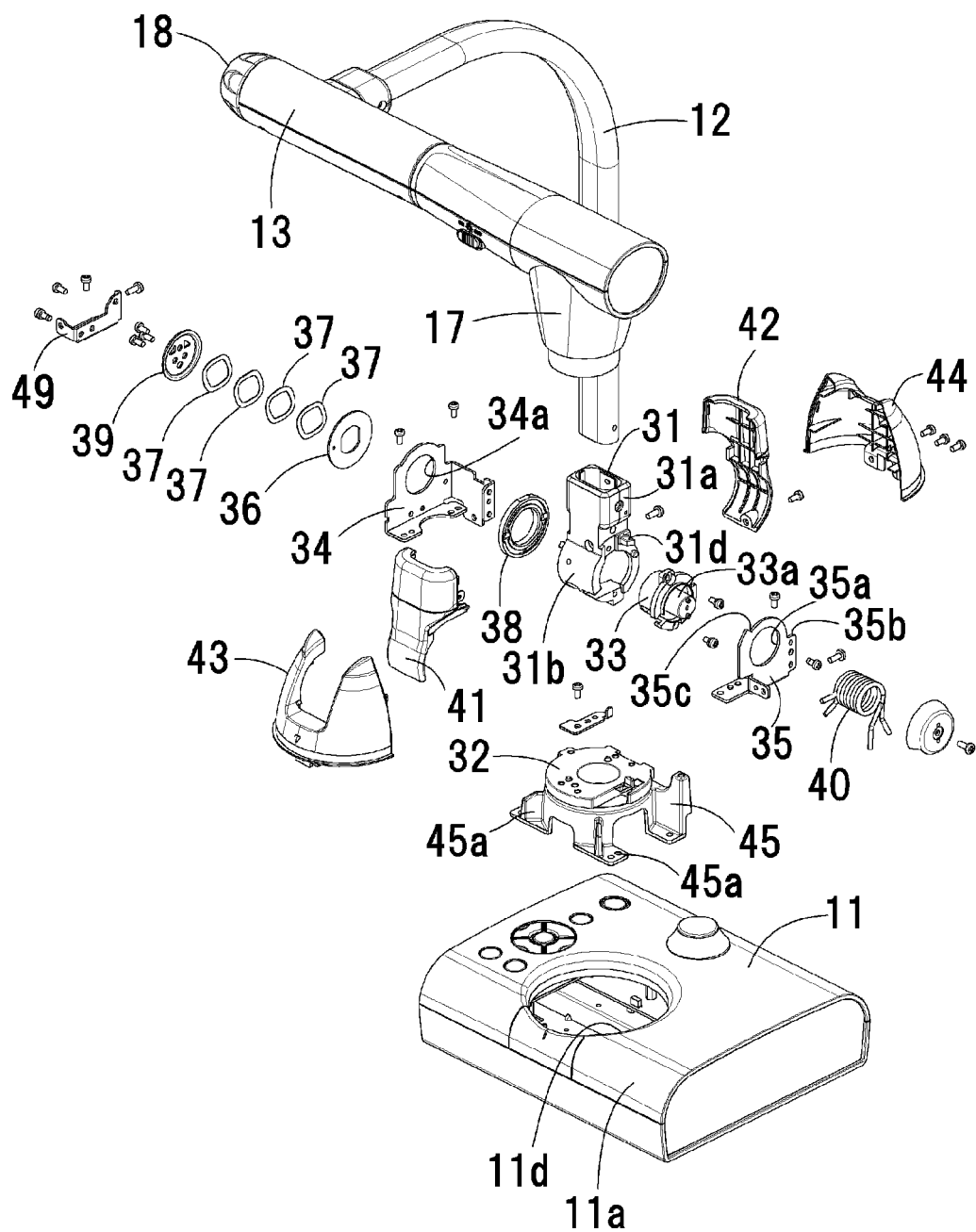
FIG. 5 is an exploded perspective view of a third connecting shaft.
Figure 6:
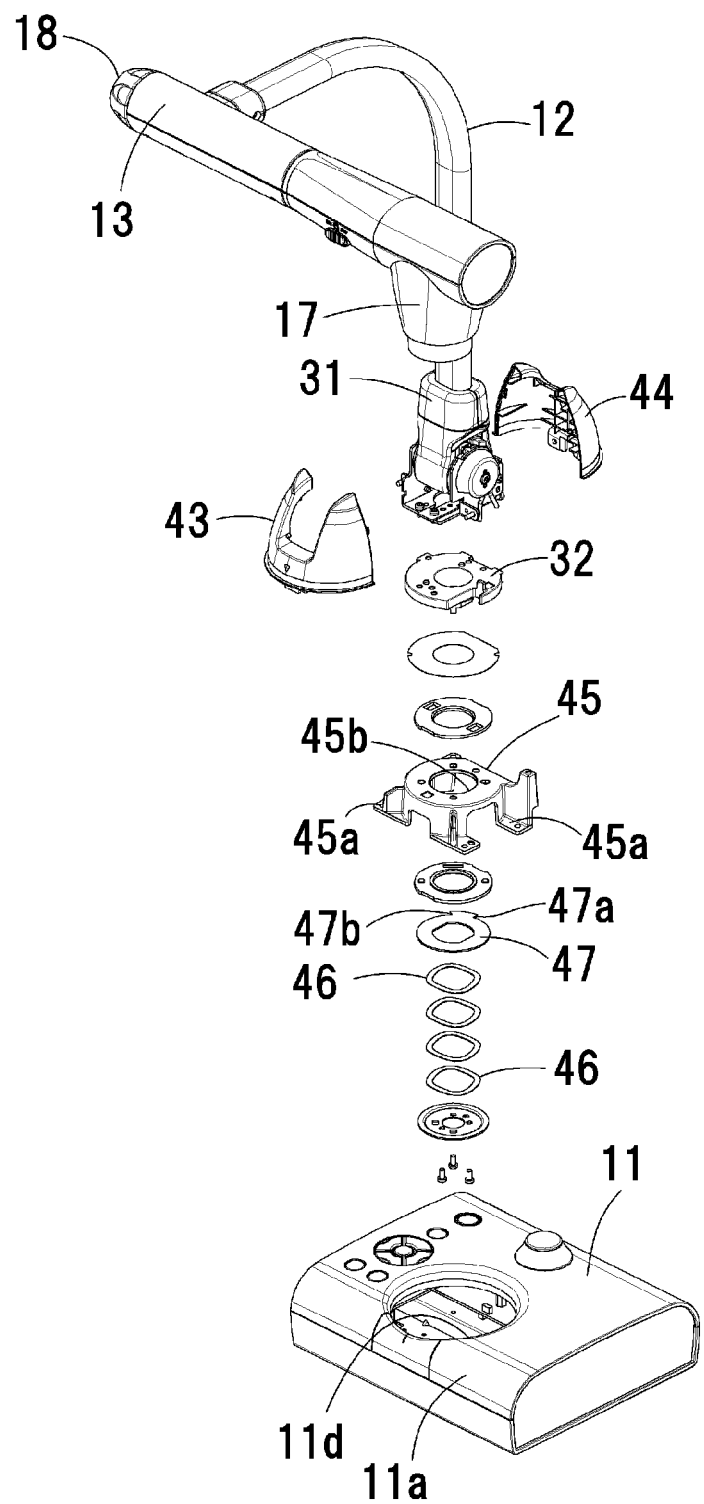
FIG. 6 is an exploded perspective view of a fourth connecting shaft.
Figure 7:
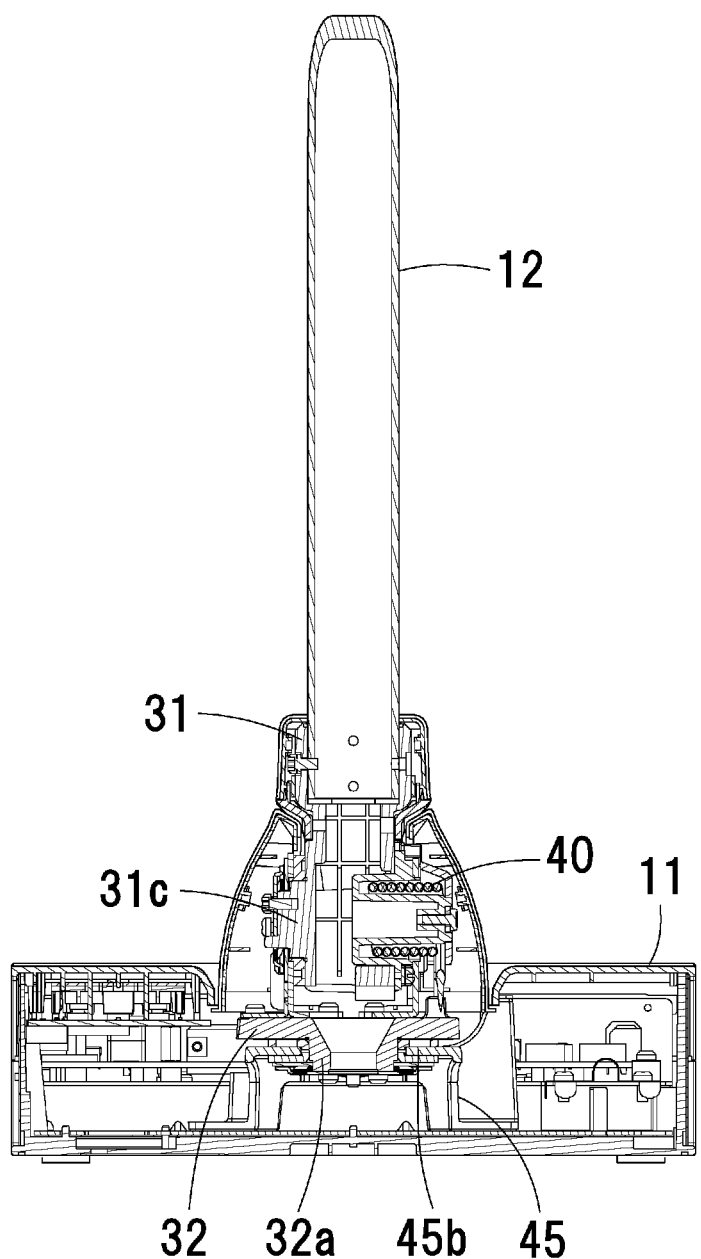
FIG. 7 is a longitudinal section of the material imaging apparatus.

The support pillar 12 is mounted via a third connecting shaft 31 on the base 11 so as to be tiltable frontward and is rotatably mounted via a fourth connecting shaft 32 on the base 11, as shown in FIGS. 5 to 7. The third connecting shaft 31 includes an upper piece 31a having a generally rectangular cross-section and a lower piece 31b having a generally cylindrical shape. The upper and lower pieces 31a and 31b are formed integrally with each other by aluminum die casting. A proximal end of the support pillar 12 is inserted into the upper piece 31a to be fixed to the upper piece 31a by a small screw. A third auxiliary connecting shaft 33 is inserted into the lower piece 31b to be fixed to the lower piece 31b by a small screw. The lower piece 31b has an end having a cylindrical shaft 31c (see FIG. 7) formed integrally therewith. The cylindrical shaft 31c is rotatably inserted into a bearing hole 34a of a third bracket 34. The third auxiliary connecting shaft 33 has a small diameter cylindrical portion 33a which is inserted into the bearing hole 35a of the fourth bracket 35. The third and fourth brackets 34 and 35 are connected together by small screws and are fixed to an upper surface of the fourth connecting 32. The lower piece 31b has a side which is located at the fourth bracket 35 side and from which a stopper pin 31d protrudes. On the other hand, the fourth bracket 35 is formed with a pair of stopper surfaces 35b and 35c on which the stopper pin 31d abuts. A tilt angle range of the support shaft 12 is set by the stopper pin 31d and the stopper surfaces 35b and 35c. The range is set to 48 degrees forward as shown by arrow D in FIG. 1. When the stopper pin 31d abuts on one 35b of the stopper surfaces 35b and 35c, the support pillar 12 is positioned at a standing position where the support pillar 12 stands from the base 11, as will be described later. When the stopper pin 31d abuts on the other stopper surface 35c, the support pillar 12 is positioned at a head forward position where the support pillar 12 is most tilted.

A spacer 36 and a plurality of washers 37 are attached to the cylindrical shaft 31c of the lower piece 31b. More specifically, the spacer 36 and the washers 37 are attached to the cylindrical shaft 31c protruding from the bearing hole 34a of the third bracket 34. A spacer 38 is interposed between the third bracket 34 and the lower piece 31b. A dish-shaped plate 39 is fixed to an end face of the cylindrical shaft 31c by a small screw, and the spacer 36 and the washers 37 are retained by the plate 39. The washers 37 cause a frictional force between the third bracket 34 and the spacer 36 and provide the frictional force to the cylindrical shaft 31.

A coil spring 40 is attached to the small diameter cylindrical portion 33a of the third auxiliary connecting shaft 33. The coil spring 40 has two ends one of which is locked by the lower piece 31b, and the other end locked by the fourth connecting shaft 32. The coil spring 40 is attached to apply a biasing force in the standing direction to the support pillar 12.

A front inner cover 41 and a rear inner cover 42 are mounted on the third connecting shaft 31 by respective small screws. A front outer cover 43 is screwed to a reinforcement plate 49 mounted on the third bracket 34 and the fourth bracket 35. The rear outer cover 44 is hitched to the front outer cover 43 by a claw and screwed to the fourth connecting shaft 32.

The fourth connecting shaft 32 is formed into a substantially disc shape and has the cylindrical shaft 32a (see FIG. 7) formed on central bottom. On the other hand, the base 11 has an opening 11d formed in a middle part thereof with respect to the right-left direction and located near the front. A fifth bracket 45 is mounted in the opening 11d. The fifth bracket 45 has a leg strip 45a which is fixed to the bottom of the base 11 by a small screw. The fifth bracket 45 is formed with a centrally located bearing hole 45b into which the cylindrical shaft 32a of the fourth connecting shaft 45 is rotatably inserted into the bearing hole 45b. Washers 46 are interposed between the bearing hole 45b and the cylindrical shaft 32a. Furthermore, the cylindrical shaft 32a protruding from the bearing hole 45b includes a non-circular section part to which a stopper ring 47 is attached. The washers 46 are mounted to apply a frictional force to the cylindrical shaft 32a. The stopper ring 47 is attached to the non-circular section so as to be rotatable together with the cylindrical shaft 32a. On the other hand, a stopper pin (not shown) protrudes from the underside of the fifth bracket 45 so as to abut on stopper surfaces 47a and 47b. Upon rotation of the cylindrical shaft 32a in one direction, the stopper ring 47 is rotated together with the cylindrical shaft 32a such that the stopper pin abuts on the stopper surface 47a, with the result that the cylindrical shaft 32a is stopped. Furthermore, upon rotation of the cylindrical shaft 32a in the other direction, the stopper pin 32a abuts on the stopper surface 47b thereby to be stopped. The cylindrical shaft 32a has a rotational angle range that is set to 180 degrees in the clockwise direction and 120 degrees in the counterclockwise direction as viewed at the planar surface of the base 11 and as shown by arrows E and F in FIG. 1 respectively.

As described above, the imaging camera 13 is rotatably mounted via the first connecting shaft 21 on the distal end of the support pillar 12. The rotational movement range of the imaging camera 13 is limited by the stopper pin 21b and the groove 24a. The camera neck 20 is rotatably mounted via the second connecting shaft 22 on the camera base 19. The rotational movement range of the camera neck 20 is limited by the stopper pin 25d and the stopper surfaces 26a and 26b. Furthermore, the support pillar 12 is tiltably mounted via the third connecting shaft 31 on the base 11, and the pivotal movement range of the support pillar 12 is limited by the stopper pin 31d and the stopper surfaces 35b and 35c. The support pillar 12 is further mounted via the fourth connecting shaft 32 on the base 11 so as to be rotatable. The rotation range of the support pillar 12 is limited by the stopper surfaces 47a and 47b and the stopper pin.

Usage of the material imaging apparatus 10 according to the embodiment will now be described. FIG. 1 shows the basic form of the material imaging apparatus 10. In the basic form, the imaging camera 13 is set to the right horizontal position in which the imaging lens 17 is located on the right of the base 11 and the casing 16 is substantially in parallel to the base placement surface. The imaging lens 17 is directed to the base placement surface and is set to the downwardly vertical position in which the optical axis of the imaging lens 17 is substantially vertical to the base placement surface. Material 48 is placed in a region on the front right side of the base 11 to be imaged.

Figure 8:
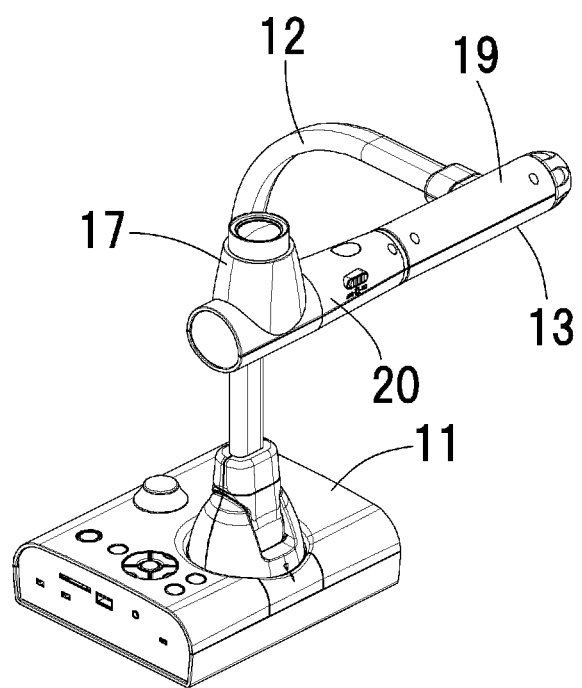
FIG. 8 is a perspective view of the material imaging apparatus, showing a first manner of use.
Figure 9:
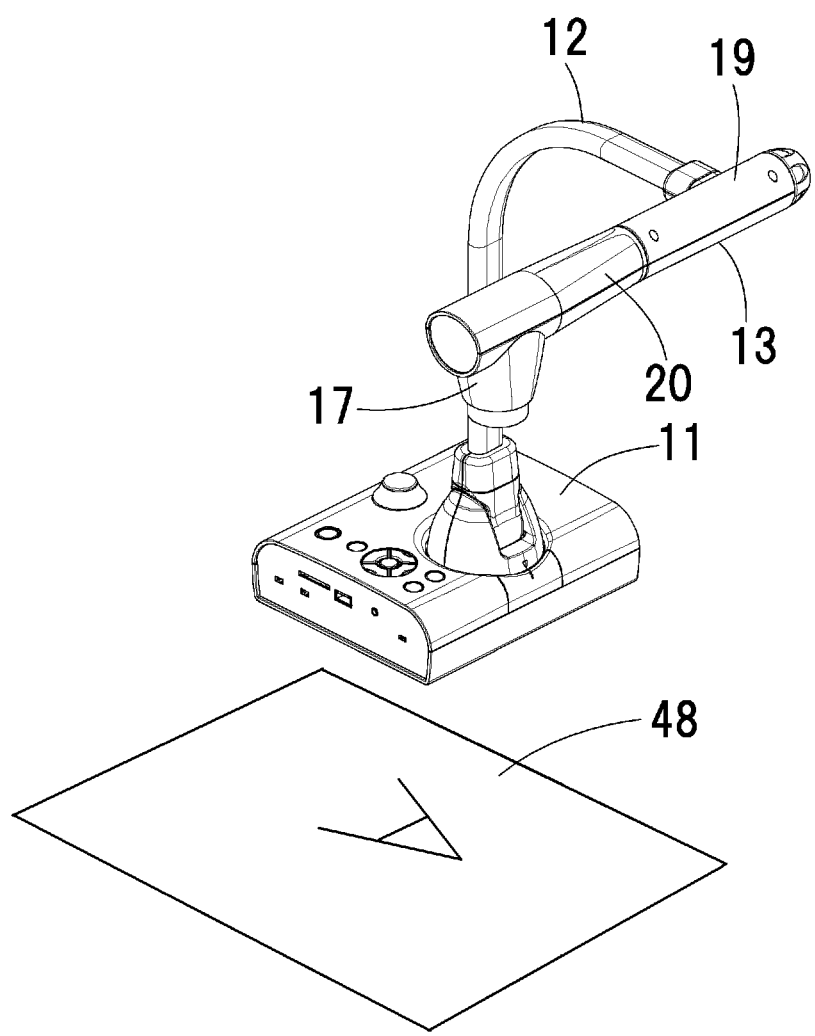
FIG. 9 is a perspective view of the material imaging apparatus, showing a second manner of use.

When the material 48 is placed in a region on the front left side of the base 11 on the base placement surface to be imaged, the imaging camera 13 is caused to pivot from the basic form by 180 degrees in the direction of arrow of arrow A in FIG. 1 with the first connecting shaft 21 serving as a fulcrum. In this state, the imaging camera 13 is located on the left side of the base 11 as shown in FIG. 8. The imaging camera 13 assumes the downwardly vertical position in which the imaging lens 17 is then directed to the side opposed to the base placement surface and the optical axis of the imaging lens 17 is substantially vertical to the base placement surface. The camera neck 20 is then rotated by 180 degrees in the direction of arrow B in FIG. 1 relative to the camera base 19 with the second connecting shaft 22 serving as a fulcrum. Consequently, as shown in FIG. 9, the optical axis of the imaging lens 17 assumes a downwardly vertical position, whereupon the material 48 can be imaged. In this case, the material 48 is placed back to front relative to a placement manner in FIG. 1.

Figure 10:
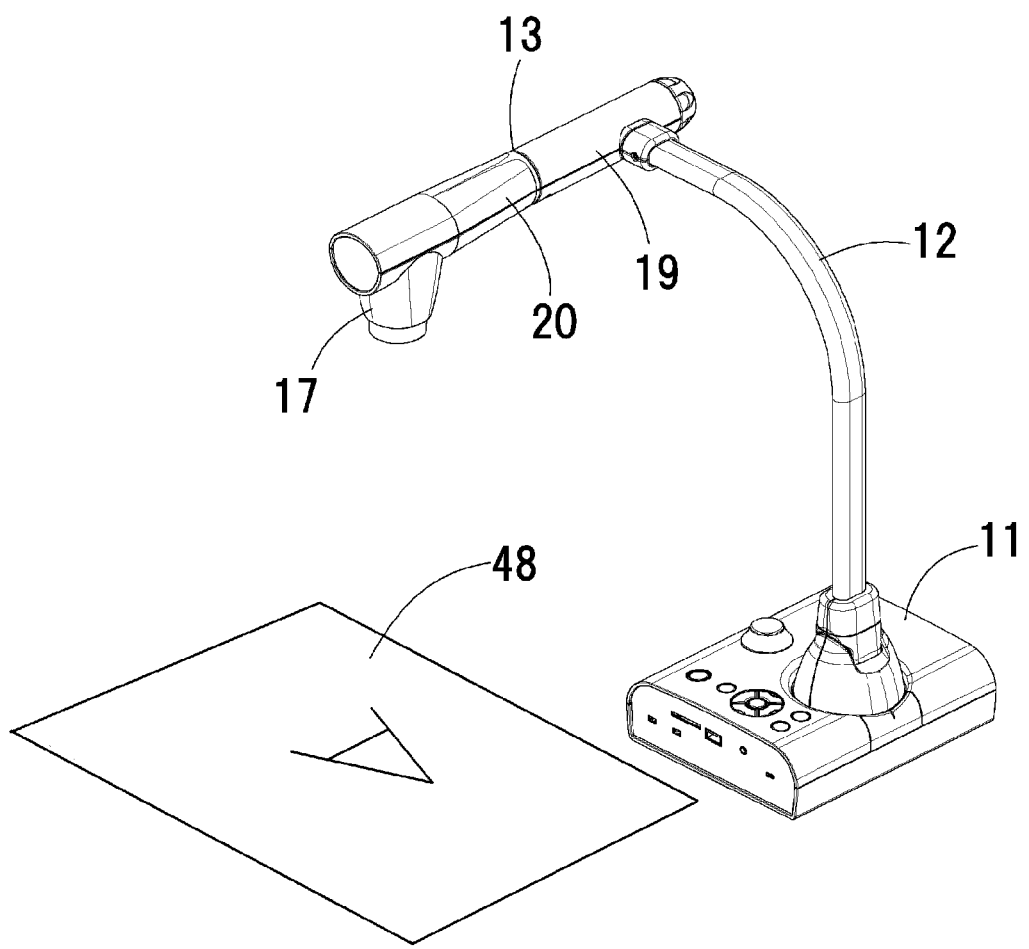
FIG. 10 is a perspective view of the material imaging apparatus, showing a third manner of use.
Figure 11:
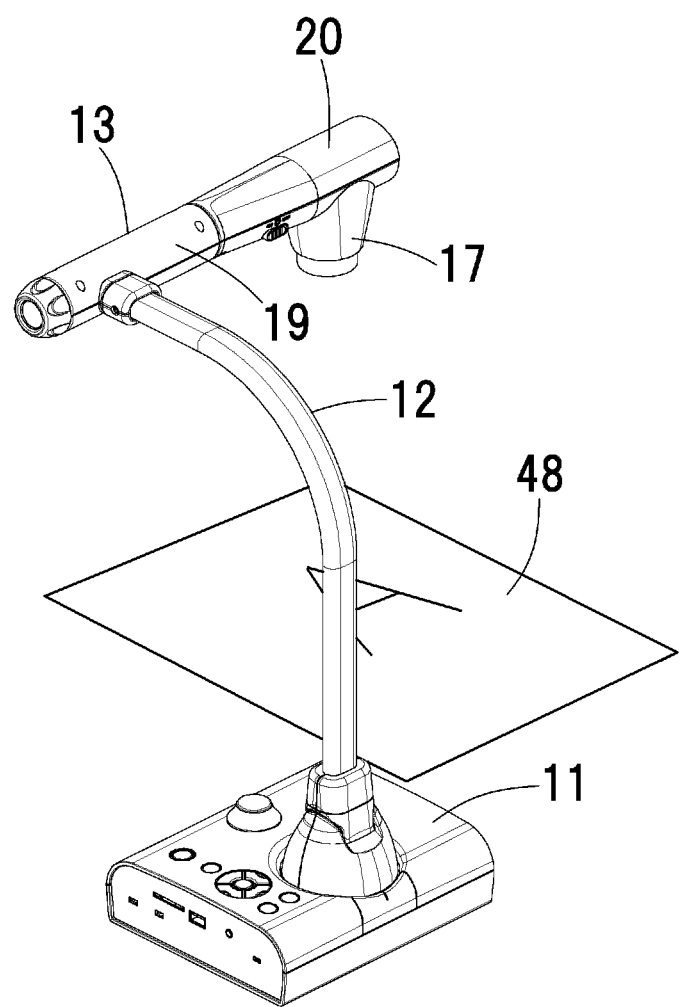
FIG. 11 is a perspective view of the material imaging apparatus, showing a fourth manner of use.

When the material 48 is placed in a region on the rear left side of the base 11 on the base placement surface to be imaged, the imaging camera 13 is caused to pivot from the basic form by 180 degrees in the direction of arrow of arrow E in FIG. 1 with the fourth connecting shaft 32 serving as a fulcrum. In this state, the imaging camera 13 is located on the rear left side of the base 11 as shown in FIG. 10. The imaging camera 13 assumes the downwardly vertical position in which the imaging lens 17 is directed to the base placement surface side and the optical axis of the imaging lens 17 is substantially vertical to the base placement surface. In this case, the material 48 is placed back to front relative to a placement manner in FIG. 1.

When the material 48 is placed in a region on the rear right side of the base 11 on the base placement surface to be imaged, the imaging camera 13 is caused to pivot from the form shown in FIG. 10 by 180 degrees with the first connecting shaft 21 serving as a fulcrum. In this state, the imaging camera 13 is located on the rear right side of the base 11. The imaging camera 13 assumes the upwardly vertical position in which the imaging lens 17 is then directed to the side opposed to the base placement surface and the optical axis of the imaging lens 17 is substantially upwardly vertical to the base placement surface. The camera neck 20 is then rotated by 180 degrees in the direction of arrow B in FIG. 1 relative to the camera base 19. Consequently, the optical axis of the imaging lens 17 assumes downwardly vertical position, whereupon the material 48 can be imaged.

Figure 12:
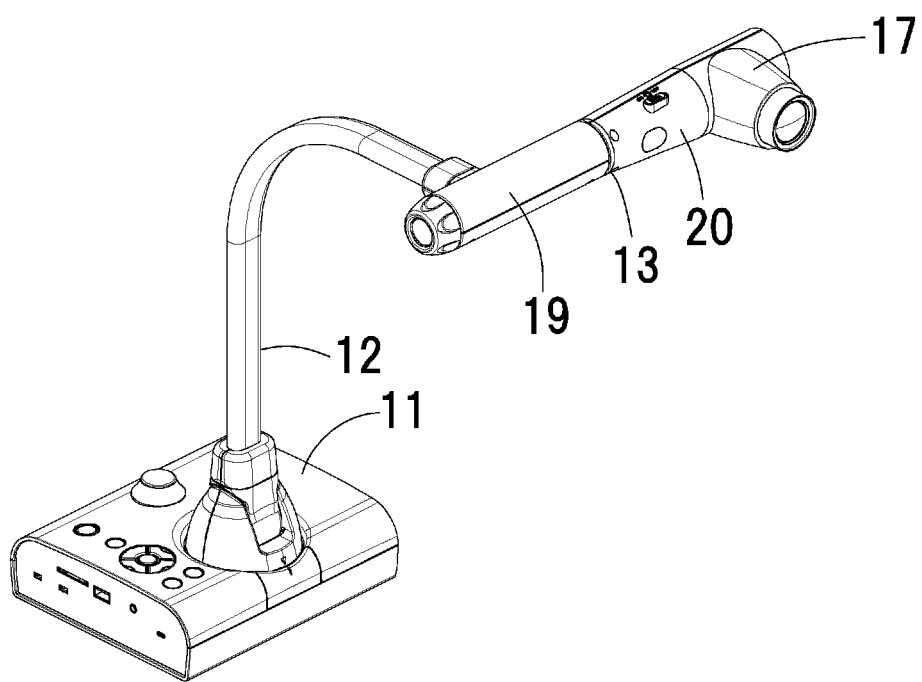
FIG. 12 is a perspective view of the material imaging apparatus, showing a fifth manner of use.
Figure 13:
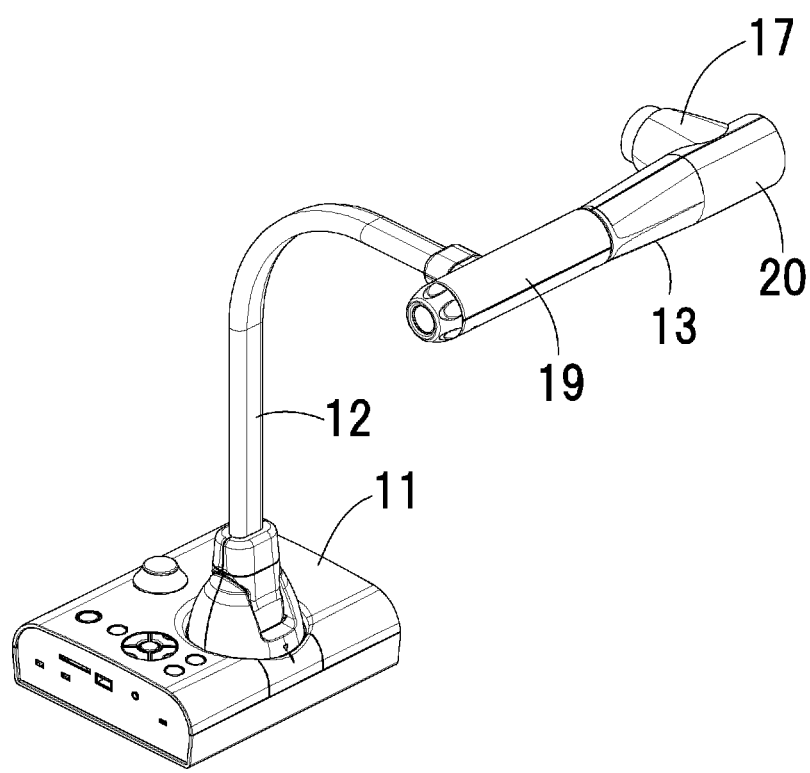
FIG. 13 is a perspective view of the material imaging apparatus, showing a sixth manner of use.
Figure 14:
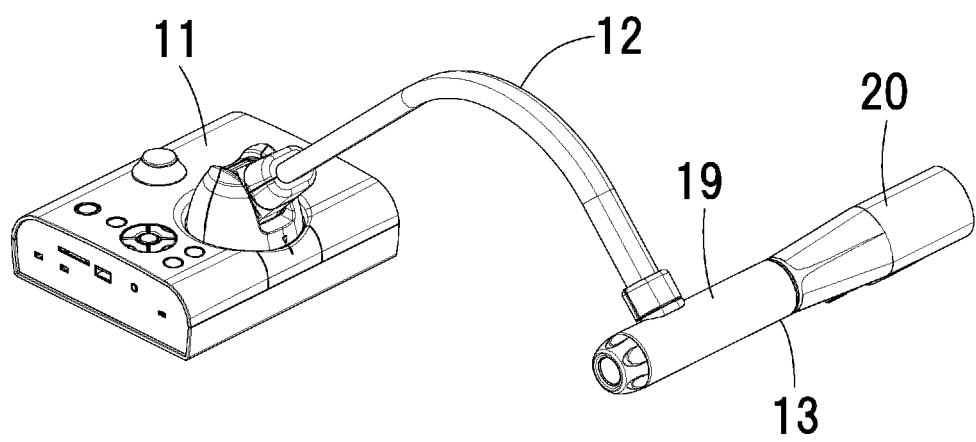
FIG. 14 is a perspective view of the material imaging apparatus, showing a storage form thereof.
Figure 15:
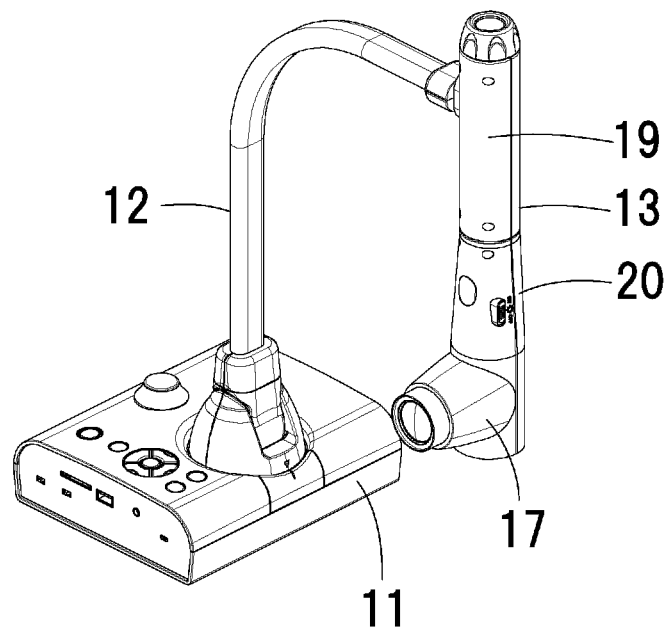
FIG. 15 is a perspective view of the material imaging apparatus, showing a seventh manner of use.
Figure 16:
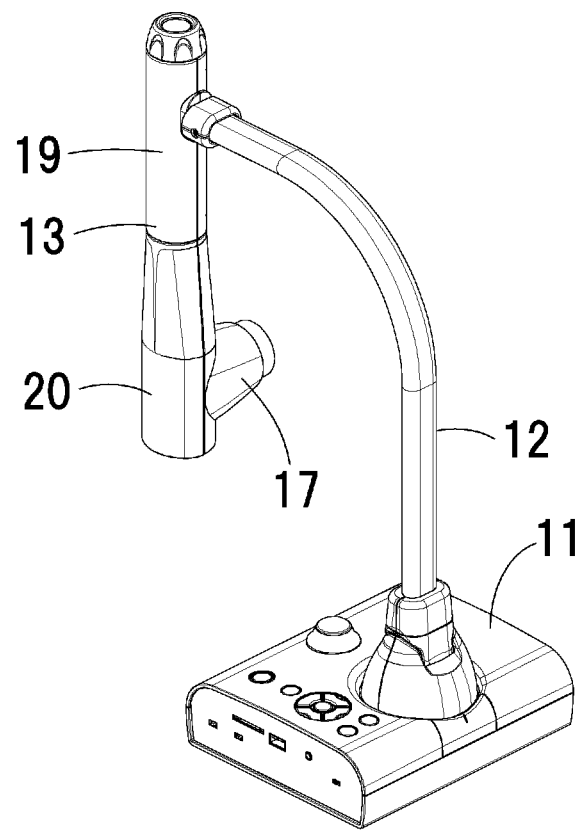
FIG. 16 is a perspective view of the material imaging apparatus, showing another storage form thereof.

The material imaging apparatus according to the embodiment is set to each of manners of use as shown in FIGS. 1, 9, 10 and 11 thereby to image the material 48 placed on the base placement surface. Moreover, when the camera neck 20 is rotated from the basic form as shown in FIG. 1, imaging can be executed with the optical axis of the imaging lens 17 being directed ahead of or to rearward of the imaging camera 13 as shown in FIGS. 12 and 13. Furthermore, the height of the apparatus can be reduced when the support pillar 12 is tilted frontward from the basic form with the third connecting shaft 31 serving as a fulcrum. This reduces the space for storage of the apparatus can be reduced and can improve the storability of the apparatus. Still furthermore, when caused to pivot about 90 degrees from the basic form, the imaging camera 13 can droop from the support pillar 12 ahead of the base 11 as shown in FIG. 15, and when caused to pivot about 90 degrees from the state as shown in FIG. 10, the imaging camera 13 can droop from the support pillar 12 to rearward of the base 11 as shown in FIG. 16. Consequently, the imaging camera 13 can obtain images with respect to the right-left direction. Additionally, when the imaging camera 13 assumes the position as shown in FIG. 16, the depth of the imaging apparatus 10 can be reduced and accordingly, can reduced the space necessary for storage.

Although the support pillar 12 stands on the part of the base 11 located in the middle of the base 11 in the right-left direction and near the base front 11a in the material imaging apparatus. However, when the support pillar stands on the central part of the upper surface of the base 11, a material placement space of the base placement surface in the front-back direction and the right-left direction becomes symmetrical about the support pillar 12. This can further improve the usability of the material imaging apparatus.

The directions of the material are opposed to each other between the case where imaging is executed in the basic form of the imaging apparatus and the case where imaging is executed in the form as shown in FIG. 9. However, when the control circuit unit has a function of converting image data according to change in the form of the imaging apparatus, an erected image can be displayed on a display without inverting the direction of the material.

The foregoing description and drawings are merely illustrative of the present disclosure and are not to be construed in a limiting sense. Various changes and modifications will become apparent to those of ordinary skill in the art. All such changes and modifications are seen to fall within the scope of the appended claims.

What is claimed is:

1. A material imaging apparatus comprising:
a base having a substantially rectangular planar shape;
a support pillar standing on a middle part of the base in a right-left direction with respect to the base, the support pillar having a distal end which is curved so as to project in a direction such that the distal end thereof departs forward from the base; and
an imaging camera mounted via a first connecting shaft on the distal end of the support pillar so as to be pivotable within a plane substantially perpendicular to a base placement surface, the imaging camera including a casing, an imaging lens projecting from a side of the casing located at one of two lengthwise ends of the casing and an operating portion provided on the other lengthwise end surface of the casing, the imaging camera being divided into a camera base provided with the first connecting shaft and a camera neck provided with the imaging lens, wherein:

the first connecting shaft is shifted from the lengthwise middle of the casing so that a distance from the first connecting shaft to the imaging lens is longer than a distance from the first connecting shaft to the operating portion;

the camera neck is rotatably mounted via a second connecting shaft on the camera base, the second connecting shaft having a shaft center extending in the lengthwise direction of the casing;

the imaging camera is mounted via the first connecting shaft on the support pillar so as to be pivotable within a plane substantially perpendicular to the base placement surface between a right horizontal position where the imaging lens is located on a right side of the base and the casing is substantially in parallel to the base placement surface and a left horizontal position where the imaging lens is located on a left side of the base and the casing is substantially in parallel to the base; and the camera neck is mounted via the second connecting shaft on the camera base so as to be rotatable between a downwardly vertical position where when the imaging camera assumes the right or left horizontal position, the imaging lens is directed to the base placement surface side and an optical axis of the imaging lens is substantially vertical to the base placement surface, and an upwardly vertical position where the imaging lens is directed to a side opposed to the base placement surface and the optical axis of the imaging lens is substantially vertical position.

2. The material imaging apparatus according to claim 1, wherein the support pillar is mounted via a third connecting shaft on the base so as to be tiltable relative to the base.

3. The material imaging apparatus according to claim 1, wherein the support pillar is rotatably mounted via a fourth connecting shaft on the base so that the imaging camera is pivotable about 180 degrees from the right or left horizontal position within the plane substantially parallel to the base placement surface to rearward of the base.

* * * * *